US008997919B2

(12) United States Patent
Yasui et al.

(10) Patent No.: US 8,997,919 B2
(45) Date of Patent: *Apr. 7, 2015

(54) MOTOR-DRIVEN STEERING CONTROLLER AND AUTOMOBILE ANTI-SKID CONTROLLER

(75) Inventors: Yoshiyuki Yasui, Nagoya (JP); Wataru Tanaka, Anjo (JP); Yuji Muragishi, Nagoya (JP); Eiichi Ono, Toyota (JP); Katsuhiro Asano, Toyoake (JP); Minekazu Momiyama, Chiryu (JP); Hiroaki Kato, Nukata-gun (JP); Kenji Asano, Toyota (JP)

(73) Assignees: Aisin Seiki Kabushiki Kaisha, Kariya-Shi, Aichi-Ken (JP); Jtekt Corporation, Chuo-Ku, Osaka (JP); Advics Co., Ltd., Kariya, Aichi-Pref. (JP)

( * ) Notice: Subject to any disclaimer, the term of this patent is extended or adjusted under 35 U.S.C. 154(b) by 348 days.

This patent is subject to a terminal disclaimer.

(21) Appl. No.: 12/718,545

(22) Filed: Mar. 5, 2010

(65) Prior Publication Data

US 2010/0161180 A1 Jun. 24, 2010

Related U.S. Application Data

(60) Division of application No. 11/889,761, filed on Aug. 16, 2007, now Pat. No. 7,699,137, which is a continuation of application No. 10/408,356, filed on Apr. 8, 2003, now Pat. No. 7,374,014.

(30) Foreign Application Priority Data

Apr. 8, 2002 (JP) .................................. 2002-104901

(51) Int. Cl.
*B62D 5/04* (2006.01)
*B60T 8/1755* (2006.01)
(Continued)

(52) U.S. Cl.
CPC .............. *B62D 5/0472* (2013.01); *B62D 5/046* (2013.01); *B60T 8/1755* (2013.01); *B60T 8/1764* (2013.01);
(Continued)

(58) Field of Classification Search
USPC ........ 180/443, 446, 402, 403; 701/41, 42, 72, 701/73
See application file for complete search history.

(56) References Cited

U.S. PATENT DOCUMENTS 5,058,018 A 10/1991 Kuwana et al.
5,089,967 A 2/1992 Haseda et al.
(Continued)

FOREIGN PATENT DOCUMENTS

DE 40 38 079 A1 6/1992
DE 44 19 131 A1 12/1994
(Continued)

*Primary Examiner* — Anne Marie Boehler
(74) *Attorney, Agent, or Firm* — Buchanan Ingersoll & Rooney PC

(57) ABSTRACT

A motor-driven steering controller for controlling a steering wheel of a vehicle. The controller includes a steering torque controlling unit, a braking force estimating unit, a right and left braking force difference estimating unit and an assist steering torque providing unit. The steering torque controlling unit controls a steering torque on the steering wheel depending on a steering operation. The braking force estimating unit estimates braking forces to be imposed on wheels of the vehicle. The right and left braking force difference estimating unit estimates difference between the braking forces to be imposed on the right and left wheels each estimated by the braking forces estimating unit. The assist steering torque providing unit provides an assist steering torque for the steering torque controlling unit on the basis of the difference in braking force between right and left wheels estimated by the right and left braking force difference estimating unit.

29 Claims, 10 Drawing Sheets

(51) Int. Cl.
*B60T 8/1764* (2006.01)
*B60W 10/184* (2012.01)
*B60W 10/20* (2006.01)
*B62D 6/00* (2006.01)

(52) U.S. Cl.
CPC ........ *B60T 2220/03* (2013.01); *B60T 2260/024* (2013.01); *B60W 10/184* (2013.01); *B60W 10/20* (2013.01); *B60W 2520/10* (2013.01); *B60W 2520/30* (2013.01); *B60W 2720/14* (2013.01); *B62D 6/003* (2013.01)

(56) References Cited

U.S. PATENT DOCUMENTS

| | | | |
|---|---|---|---|
| 5,996,724 | A | 12/1999 | Shimizu et al. |
| 6,044,319 | A | 3/2000 | Rosendahl et al. |
| 6,085,860 | A | 7/2000 | Hacki et al. |
| 6,154,696 | A | 11/2000 | Nishi et al. |
| 6,199,654 | B1 | 3/2001 | Kojo et al. |
| 6,216,079 | B1 | 4/2001 | Matsuda |
| 6,226,579 | B1 | 5/2001 | Hackl et al. |
| 6,349,789 | B1 | 2/2002 | Nakano et al. |
| 6,405,113 | B1 | 6/2002 | Yamawaki et al. |
| 6,415,215 | B1 | 7/2002 | Nishizaki et al. |
| 6,550,569 | B2 | 4/2003 | Kim et al. |
| 6,789,008 | B2 | 9/2004 | Kato et al. |
| 2002/0026268 | A1 | 2/2002 | Millsap et al. |
| 2002/0101116 | A1 | 8/2002 | Kostadina |
| 2002/0198646 | A1 | 12/2002 | Bedner et al. |
| 2003/0125847 | A1 | 7/2003 | Tinskey et al. |
| 2003/0213640 | A1 | 11/2003 | Kato et al. |
| 2005/0189163 | A1 | 9/2005 | Barton et al. |

FOREIGN PATENT DOCUMENTS

| | | |
|---|---|---|
| EP | 1 209 053 A1 | 5/2002 |
| FR | 2 817 217 A1 | 5/2002 |
| JP | 3-14772 A | 1/1991 |
| JP | 5-178225 A | 7/1993 |
| JP | 8-183470 A | 7/1996 |
| JP | 11-049003 A | 2/1999 |
| JP | 11-129927 A | 5/1999 |
| WO | WO 02/074638 A1 | 9/2002 |

1

MOTOR-DRIVEN STEERING CONTROLLER AND AUTOMOBILE ANTI-SKID CONTROLLER

This application is a divisional of application Ser. No. 11/889,761 filed on Aug. 16, 2007, now U.S. Pat. No. 7,699,137, which is a continuation of application Ser. No. 10/408,356 filed on Apr. 8, 2003, now U.S. Pat. No. 7,374,014 the entire contents of which are incorporated herein by reference in their entirety. The present disclosure relates to the subject matter contained in Japanese Patent Application No. 2002-104901 filed Apr. 4, 2002, which is incorporated herein by reference in its entirety.

BACKGROUND OF THE INVENTION

1. Field of the Invention

The present invention relates to a motor-driven steering controller and more particularly to a motor-driven steering controller which provides assist steering torque depending on difference in braking force between right and left wheels and an anti-skid controller including such a motor-driven steering controller.

2. Background Art

When braking sudden enough to cause anti-skid control is executed on a road where the frictional coefficient differs from right to left, i.e., so-called μ split road, the resulting braking force differs from right side to left side of a vehicle. The difference in braking force between the right and left sides causes generation of yaw moment that causes the vehicle to be deflected toward the higher road frictional coefficient side. On the μ slit surface of an actual road, snow or ice can be left on the edge of the road to reduce the frictional coefficient thereof while the asphalt on the central part of the road is dried or wet to have a raised frictional coefficient. When a vehicle having its right and left wheels positioned on the edge of the road and on the central part of the road, respectively, is suddenly braked, the resulting braking force is larger on the central part of the road, which has a large frictional coefficient, than on the edge of the road, which has a smaller frictional coefficient. As a result, yaw moment is developed on the vehicle to cause the vehicle to be deflected toward the central part of the road.

In order to reduce yaw moment generated due to the difference in braking force between right and left, the operator needs to steer in a direction opposite the deflecting direction of the vehicle. This steering is known as counter-steering. However, this counter-steering requires some deal of skill.

On the other hand, anti-skid control is normally arranged such that the braking force on the front wheels is subjected to yaw moment inhibition control while the braking force on the rear wheels is subjected to select low control to inhibit sudden yaw moment caused by the difference in braking force between right and left when sudden braking is executed on μ split road. The yaw moment inhibition control is adapted to raise the time gradient of braking force on the wheel on high frictional coefficient side (i.e., reduce the gradient of rise of braking force with respect to time) when the road is judged to be μ split road, to thereby inhibit the generation of sudden yaw moment. The select low control is adapted to control the braking force on high frictional coefficient side according to the braking force on low frictional coefficient side. Both the yaw moment inhibition control and the select low control reduce the braking force on high frictional coefficient side, giving a long braking distance.

In this respect, JP-A-8-183470 proposes a power steering device which reduces steering torque necessary for steering according to the difference in braking forces between right and left wheels to facilitate a counter-steering operation. It is specifically described that, when the difference in braking forces between the right and left wheels is sensed to be large while operating the anti-skid controller, solenoid valves are controlled to control the hydraulic pressure to be supplied into a reaction variable mechanism in control valves so that the steering reaction to be imposed on the operation of the steering wheel by the reaction variable mechanism is reduced.

JP-A-11-129,927 proposes the running wheel control structure of a motor-driven steering vehicle provided with a torque steer inhibition controlling unit. In this, a problem is taken into account that when a vehicle having a right and left wheel control system on board is controlled such that driving forces (or braking forces) which are not equal from right to left are acted on the wheels to be steered (front wheels in ordinary vehicle), moment developed around the king pin by driving/braking force differs from the right wheel to the left wheel when an ordinary suspension is used, causing a steering kickback, loss of control over a steering wheel due to the turning of the wheels to be steered.

The above cited official gazette describes an arrangement of the device as follows. That is, when there occurs difference in control value between the right and left wheel while the driving/braking force control is separately executed over the right and left wheels, torque steer inhibition control signal is outputted to the motor-driven power steering device to cancel moment (torque steer) developed around the king pin due to the difference in driving force/braking force between the right and left wheels, making it possible to execute torque steer inhibition control in addition to ordinary assist control by the motor-driven power steering device.

SUMMARY OF THE INVENTION

The power steering device disclosed in the above cited JP-A-8-183470 is adapted to reduce steering torque during counter-steering operation, making it easy for an operator who can execute counter-steering operation to operate the power steering device. However, the power steering device is not necessarily useful for ones who cannot operate counter-steering properly.

The device disclosed in JP-A-11-129927 is adapted to execute torque steer inhibition control for canceling moment (torque steer) developed around the king pin due to the difference in driving force/braking force between the right and left wheels. The king pin is the central axis of steering of wheel in the suspension having a steering system. There are a case where the grounding point of the king pin axis on the grounding surface of the wheel is inside the application point (positive king pin offset) and a case where the grounding point of the kingpin axis on the grounding surface of the wheel is outside the application point (negative king pin offset). For example, in the case where braking force on the left wheel is large and braking force on the right wheel is small, when the king pin offset is positive, moment is acted on the right wheel causing the left wheel to take a left turn while moment is acted on the right wheel causing the right wheel to take a right turn. During this process, since braking force on the left wheel is larger than on the right wheel, torque is developed causing the wheel to take a left turn. This torque causes a steering kickback (phenomenon that the wheel causes the steering wheel to rotate counterclockwise). In contrast, in the case of negative king pin offset, a moment acts on the left wheel causing the wheel to take a right turn while moment acts on the right wheel causing the wheel to take a right turn. During this process, the difference in braking force between the right and left wheels causes the development of moment causing the wheels to take a right turn. This torque causes loss of control over the steering wheel.

Thus, regardless of whether the kingpin offset is positive or negative, the difference in braking force between the right and left wheels makes moments around the king pin unbalanced, causing the steering kickback i.e., torque steering. The device disclosed in the above JP-A-11-129927 is aimed to inhibit this torque steering. In other words, the aforementioned device is aimed to prevent the steering kickback due to the difference in braking force between the right and left wheels. It is arranged such that when there occurs difference in braking force between the right and left wheels during forward running, auxiliary torque corresponding to the difference in braking force between the right and left wheels is added to prevent the steering kickback, that is, to keep the steering wheel straight. It is certain that the negative king pin offset due to mechanical and geometrical configuration of the suspension can steer the wheels and steering wheel in the direction opposite to the direction in which the vehicle is deflected by the difference in braking force between the right and left wheels, by making the use of unbalance of torque around the king pin shaft. However, a complicated structure is needed to realize a negative king pin offset by the configuration of suspension.

The invention relates to a motor-driven steering controller and its an aim is to facilitate counter-steering operation for inhibiting the deflection of a vehicle toward high frictional coefficient side due to the difference in braking force between the right and left wheels occurring when braking force is provided to the wheels on so-called µ split road.

Another aim of the invention is to facilitate counter-steering operation during anti-skid control in the anti-skid controller of a vehicle provided with the aforementioned motor-driven steering controller, thereby making the effective use of braking force on high frictional coefficient side to reduce the braking distance.

In order to solve the aforementioned problems, the invention provides a motor-driven steering controller for controlling a steering wheel of a vehicle, including: a steering torque controlling unit for controlling a steering torque on the steering wheel depending on a steering operation of the vehicle; a braking force estimating unit for estimating braking forces to be imposed on wheels of the vehicle; a right and left braking force difference estimating unit for estimating difference between the braking forces to be imposed on the right and left wheels each estimated by the braking forces estimating unit; and an assist steering torque providing unit for providing an assist steering torque for the steering torque controlling unit on the basis of the difference in braking force between right and left wheels estimated by the right and left braking force difference estimating unit.

Preferably, the motor-driven steering controller further includes a vehicle stability controlling unit for controlling a stability of the vehicle depending on a traveling state of the vehicle. The assist steering torque providing unit is arranged so as to inhibit provision of the assist steering torque when the stability of the vehicle is controlled by the vehicle stability controlling unit.

Preferably, the assist steering torque providing unit is arranged so as to set the assist steering torque depending on a temporal variation in the difference between the braking forces of the right and left wheels estimated by the right and left braking force difference estimating unit.

Preferably, the assist steering torque providing unit is arranged so as to set the assist steering torque larger as a velocity of the vehicle increases.

Preferably, the assist steering torque providing unit is arranged so as to set the assist steering torque larger when the vehicle takes a turn than when the vehicle goes straight ahead.

The invention further provides an anti-skid controller in a vehicle including a motor-driven steering controller for controlling a steering wheel of the vehicle, wherein the motor-driven steering controller includes a steering torque controlling unit for controlling a steering torque on the steering wheel depending on a steering operation of the vehicle, a braking force estimating unit for estimating braking forces to be imposed on wheels of the vehicle, a right and left braking force difference estimating unit for estimating difference between the braking forces to be imposed on the right and left wheels each estimated by the braking forces estimating unit, and an assist steering torque providing unit for providing an assist steering torque for the steering torque controlling unit on the basis of the difference in braking force between right and left wheels estimated by the right and left braking force difference estimating unit. The anti-skid controller includes: a control parameter setting unit for setting a first control parameter when provision of the assist steering torque by the assist steering torque providing unit is not effected and for setting a second control parameter different from the first control parameter when provision of the assist steering torque by the assist steering torque providing unit is effected; and a braking force controlling unit for controlling the braking forces to be imposed on the wheels depending on the first control parameter set by the control parameter setting unit and the second control parameter set by the control parameter setting unit.

Preferably, the control parameter setting unit is arranged so as to set the first control parameter to be a parameter for reduction control of yaw moment that causes a braking force for one of front wheels of the vehicle to rise slowly with time gradient when anti-skid control begins on the other front wheel. The control parameter setting unit is arranged so as to set the second control parameter to be a parameter having a larger time gradient than the first control parameter or a parameter for inhibiting the reduction control of yaw moment.

Preferably, the control parameter setting unit is arranged so as to set the first control parameter to be a select low control parameter for controlling a braking force on one of rear wheels of the vehicle in the same manner as on the other rear wheel when anti-skid begins on the other rear wheel. Further, the control parameter setting unit is arranged so as to set the second control parameter to be a parameter for causing the braking force on the one of the rear wheels to rise with time gradient after a predetermined period of time of select low control.

Preferably, the control parameter setting unit is arranged so as to set the second control parameter when the turning condition of the vehicle is not beyond a predetermined value.

Preferably, the anti-skid controller further includes a steering direction judging unit for judging a direction of steering by the steering operation. The control parameter setting unit is arranged so as to inhibit the setting of the second control parameter when the steering direction judging unit judges that steering is not made in the direction for a counter-steering operation regardless of the fact that a provision of assist steering torque by the assist steering torque providing unit is effected.

BRIEF DESCRIPTION OF THE DRAWINGS

The present invention may be more readily described with reference to the accompanying drawings, in which.

DETAILED DESCRIPTION OF THE PREFERRED EMBODIMENTS

Figure 1:
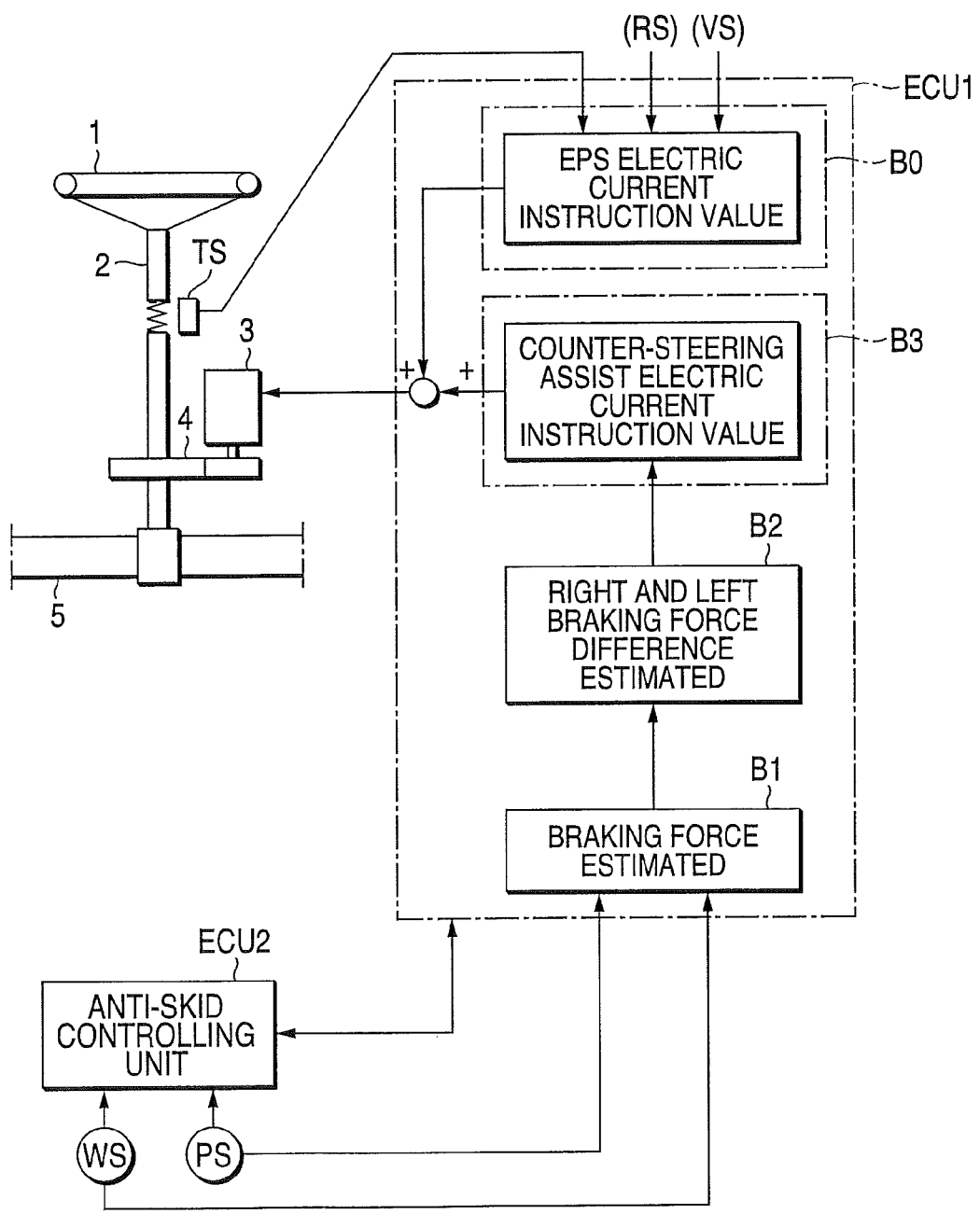
FIG. 1 is a diagram illustrating the outline of a motor-driven steering controller according to an embodiment of implementation of the invention.

Embodiment of implementation of the invention will be described hereinafter in connection with the attached drawings. FIG. 1 illustrates the outline of a motor-driven steering controller (also referred to as "motor-driven power steering controller") according to an embodiment of implementation of the invention. The motor-driven steering controller is arranged as follows: Steering torque acting on a steering shaft 2 according to the operator's operation on a steering wheel 1 is detected by a steering torque sensor TS. Steering angle is detected by a rotational angle sensor RS described later. An EPS motor (electric motor) 3 is drive-controlled on the basis of these detection signals and vehicle velocity signal (represented by VS), to thereby steer the front wheels via a reduction gear 4 and a rack-and-pinion 5, reducing the operator's power required to operate the steering wheel 1. In particular, the motor-driven steering controller is arranged so as to provide steering torque according to the difference in braking force between right and left wheels, assisting the operation during counter-steering. The control over the provision of assist steering torque according to the difference in braking force between right and left wheels will be hereinafter referred to as "counter-steering assist control".

The motor-driven steering controlling unit ECU1 according to the present embodiment is provided with a steering torque control block B0 for controlling steering torque on the steering wheel of a vehicle according to steering operation. The motor-driven steering controlling unit ECU1 is also provided with a braking force estimating block B1 for estimating braking force to be imposed on the various wheels of the vehicle, a right and left braking force difference estimating block B2 for estimating the difference between the braking force to be imposed on the right and left wheels on the basis of the braking force estimated by the braking force estimating block B1 and an assist steering torque providing block B3 for providing an assist steering torque for the steering torque controlling block B0 on the basis of the difference in braking force between right and left wheels estimated by the right and left braking force difference estimating block B2. The difference in braking force between right and left wheels is the difference between braking force imposed on the left wheel of the vehicle and braking force imposed on the right wheel. As the former braking force there is used the sum of braking force imposed on the left front and rear wheels or braking force imposed on the left front wheel. As the former braking force there is used the sum of braking force imposed on the right front and rear wheels or braking force imposed on the right front wheel.

In the braking force estimating block B1, signals from fluid pressure sensors (typically represented by PS) and wheel velocity sensors (typically represented by WS) provided on the wheels are used to estimate braking force developed on the wheels according to an equation of motion of wheel. In the right and left braking force difference estimating block B2, the difference in braking force between right and left wheels is calculated. Since a specific unit concerning the estimation of braking force is described in JP-A-2000-108863, a detailed description for that is omitted herein. Further, in the assist steering torque providing block B3, assist steering torque is determined to be provided according to the difference in braking force between right and left wheels. Corresponding to this torque, electric current instruction is then determined. Electric current instruction required to assist counter-steering (counter-steering assist electric current instruction) is then added to electric current instruction determined by an ordinary motor-driven steering controller (EPS) (hereinafter referred to as "EPS electric current instruction") to control EPS motor 3. In the present embodiment, an anti-skid controlling unit ECU2 is further provided. The anti-skid controlling unit ECU2 is connected to the aforementioned motor-driven steering controlling unit ECU1 in the following manner.

Figure 2:
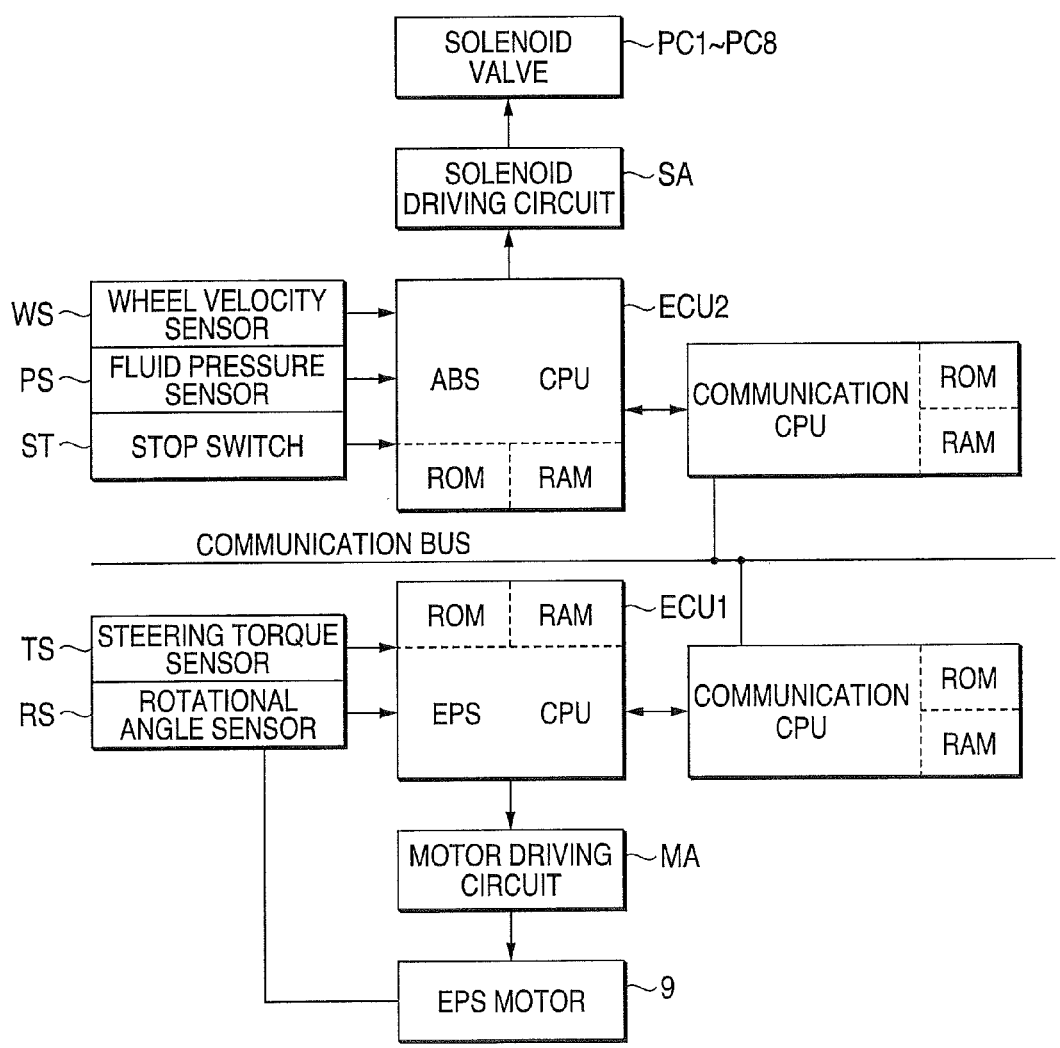
FIG. 2 is a block diagram illustrating the system configuration according to the embodiment of implementation of the invention.

FIG. 2 illustrates the system configuration of the present embodiment. The motor-driven steering controlling system and the anti-skid controlling system are connected to each other via a communication bus so that mutual system data can be shared between the two systems. In the motor-driven steering controlling system, to the motor-driven steering controlling unit ECU1 including a CPU, a ROM and a RAM for motor-driven steering control is connected to a steering torque sensor TS and a rotational angle sensor RS and to an EPS motor 3 via a motor driving circuit MA. In the anti-skid controlling system, on the other hand, to an anti-skid controlling unit ECU2 including a CPU, a ROM and a RAM for anti-skid control is connected to a wheel velocity sensor WS, a fluid pressure PS and a stop switch ST, and to solenoid valves PC1 to PC8 via a solenoid driving circuit SA. The motor-driven steering controlling unit ECU1 and the anti-skid controlling unit ECU2 are each connected to the communication bus via a communication unit including a CPU, a ROM and a RAM for communication. Thus, in the anti-skid controlling system, data on braking force developed in the various wheels are obtained, and the difference in braking force between right and left wheels is calculated on the basis of the data. In the motor-driven steering controlling system, counter-steering assist control is effected. Data on vehicle velocity required for the motor-driven steering control also can be transmitted from the anti-skid controlling system.

Figure 3:
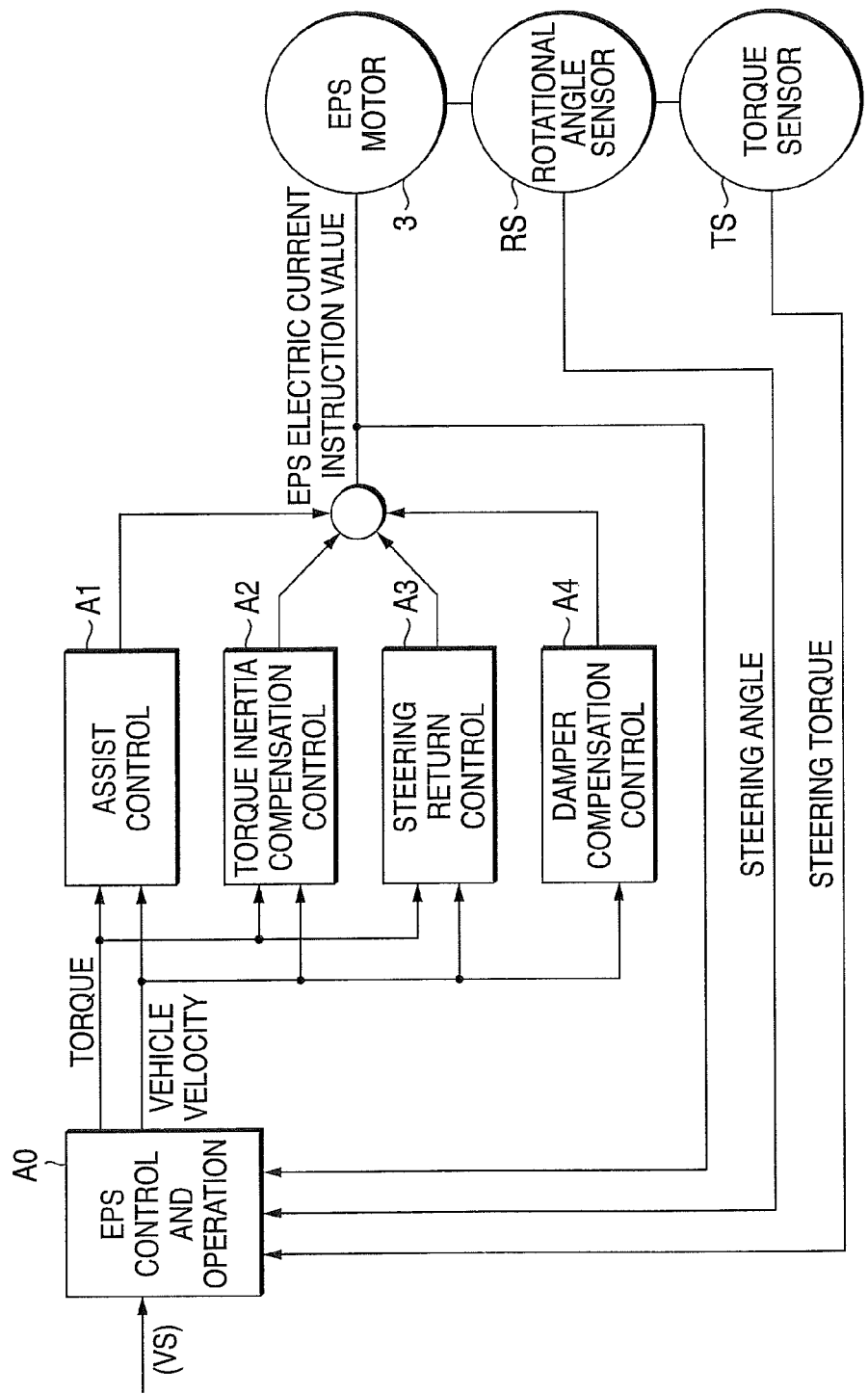
FIG. 3 is a control block diagram of the motor-driven steering controller according to the embodiment of implementation of the invention.

FIG. 3 is a control block diagram of the motor-driven steering controller. In the blocks A1 to A4, an assist control, a torque inertia compensation control, a steering return control and a damper compensation control are executed on the basis of a steering torque and a vehicle velocity signal to determine an electric current instruction value for driving the EPS motor 3. Referring to the assist control in the block A1, a torque assist for reducing the operator's power required to operate the steering wheel 1 is effected. Referring to the torque inertia compensation control in the block A2, a control is effected to compensate response delay due to inertia of the EPS motor 3. Referring to steering return control in the block A3, a control is effected to improve return of the steering wheel 1 to the neutral point. Referring to damper compensation control in the block A4, control is effected to inhibit overreturn of the steering wheel 1 and improve the convergence of the steering wheel 1. In the case where as the EPS motor 3 there is used a brushless DC motor as in the present embodiment, the EPS motor 3 is provided with a rotational angle sensor RS by which steering angle is determined for EPS control and operation in the block A0. For example, the rack and pinion 5 may be provided with a steering angle sensor to give a detection signal on the basis of which steering angle is then determined.

Figure 4:
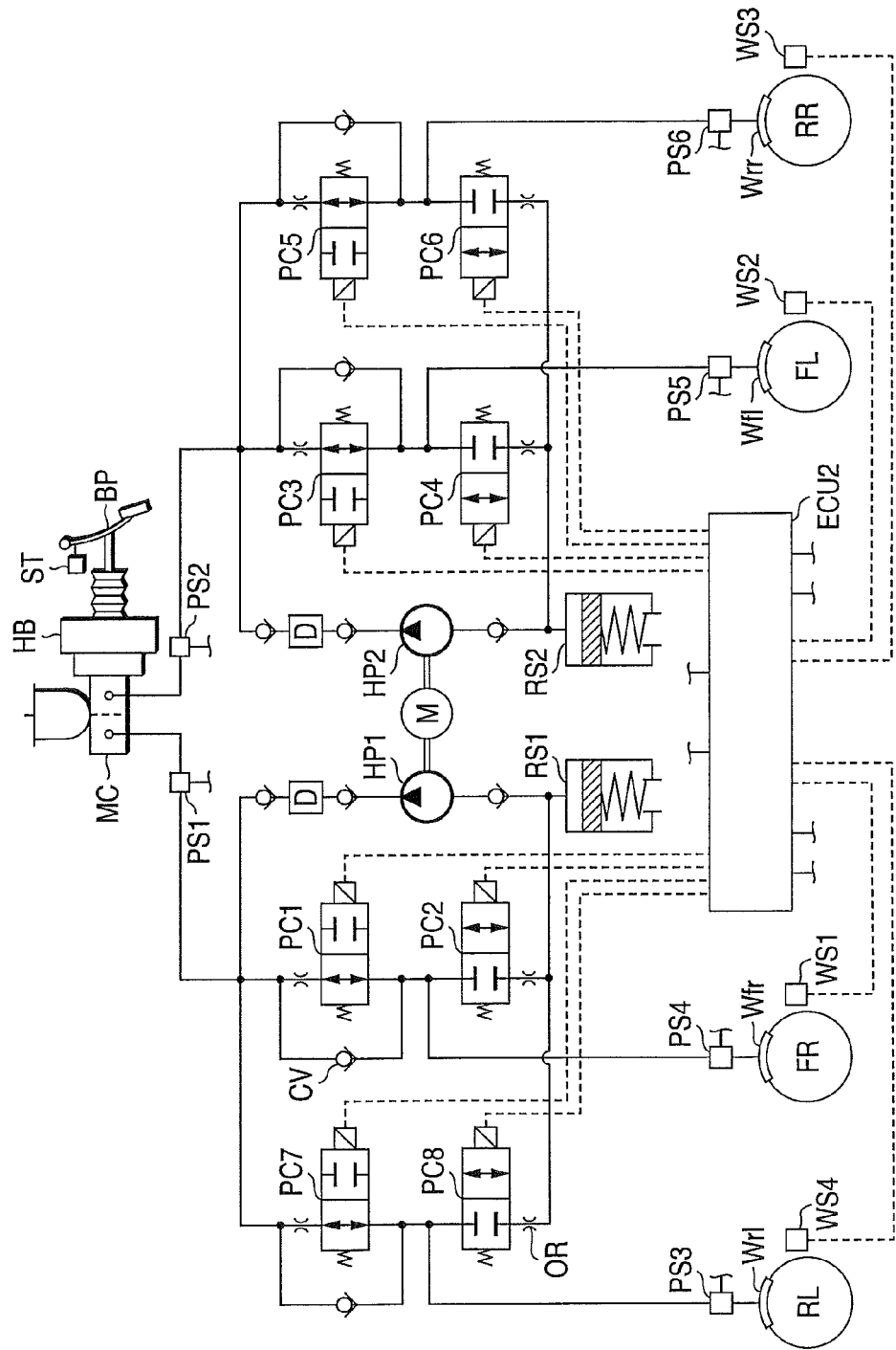
FIG. 4 is a schematic diagram illustrating an anti-skid controlling system according to the embodiment of implementation of the invention.

FIG. 4 is a diagram illustrating a brake system including an anti-skid controlling system. The anti-skid controlling system includes solenoid valves (PC1 to PC8), fluid pressure pump HP1 and HP2, a motor M, reservoirs RS1 and RS2, wheel velocity sensors (WS1 to WS4), and fluid pressure sensors (PS1 to PS6). In FIG. 4, the solenoid valves PC1 to PC8, etc. are provided interposed between a master cylinder MC and wheel cylinders Wfr, Wfl, Wrr and Wrl. In other words, on the fluid pressure paths connecting between one of the output ports of the master cylinder MC and the wheel cylinders Wfr and Wrf, respectively, are provided normally-open solenoid valves PC1 and PC7, respectively. To the middle point on the path between the solenoid valves PC1 and PC7 and the master cylinder MC is connected the discharge side of the fluid pressure pump HP1. Similarly, on the fluid pressure paths connecting between the other output port of the master cylinder MC and the wheel cylinders Wfl and Wrr, respectively, are provided normally-open solenoid valves PC3 and PC5, respectively. To the middle point on the path between the solenoid valves PC3 and PC5 and the master cylinder MC is connected the discharge side of the fluid pressure pump HP2. The fluid pressure pumps HP1 and HP2 are each driven by the electric motor M. When these pumps are operated, a brake fluid the pressure of which has been raised to a predetermined value is supplied into the aforementioned fluid pressure paths.

The wheel cylinders Wfr and Wfl are connected to normally-open solenoid valves PC2 and PC8, respectively. These solenoid valves each have a reservoir RS1 provided downstream and are connected to the suction side of the fluid pressure pump H1. Similarly, the wheel cylinders Wfl and Wrr are connected to normally-open solenoid valves PC4 and PC6, respectively. These solenoid valves each have a reservoir RS2 provided downstream and are connected to the suction side of the fluid pressure pump H2. The reservoirs RS1 and RS2 each have a piston and a spring and receive the brake fluid for the various wheel cylinders discharged via the solenoid valves PC2 and PC4 and the solenoid valves PC6 and PC8, respectively.

The solenoid valves PC1 to PC8 each are a two-port and two-position electromagnetic switching valve. When the solenoid coil of these valves are not energized, these valves are in first position shown in FIG. 4 so that the wheel cylinders Wfr, Wfl, Wrr and Wrl are communicated to the master cylinder MC. When the solenoid coil of these valves are energized, these valves are in second position so that the wheel cylinders Wfr, Wfl, Wrr and Wrl are disconnected from the master cylinder MC but communicated to the reservoir RS1 or RS2. A check valve CV is adapted to allow the reflux from the wheel cylinders Wfr, Wfl, Wrr and Wrl to the master cylinder MC but shut down the reverse flow. In FIG. 4, OR indicates an orifice, D indicates a damper, HB indicates a booster, and BP indicates a brake pedal. ST indicates a stop switch which is ON when the brake pedal is operated.

By controlling such that the solenoid coil of these solenoid valves PC1 to PC8 are energized or deenergized, the pressure of the brake fluid in the wheel cylinders Wfr, Wfl, Wrr and Wrl can be raised, reduced or kept. In other words, when the solenoid coil of the solenoid valves PC1 to PC8 are not energized, a brake fluid is supplied into the wheel cylinders Wfr, Wfl, Wrr and Wrl from the master cylinder MC and the fluid pressure pump HP1 or HP2 to raise the pressure in these wheel cylinders. When the solenoid coil of the solenoid valves PC1 to PC8 are energized, the wheel cylinders Wfr, Wfl, Wrr and Wrl are communicated to the reservoir RS1 or RS2 to reduce their pressure. When the solenoid valve of the solenoid valves PC1, PC3, PC5 and PC7 are energized but the solenoid coil of the other solenoid valves are not energized, the brake fluidpressure in the wheel cylinders Wfr, Wfl, Wrr and Wrl are kept. Accordingly, by adjusting the duty ratio according to the condition of the wheels and repeating the energization/deenergization of the aforementioned solenoid coils according to the duty ratio, fluid pressure control in pulse pressure increase mode (also referred to as "step pressure increase mode") can be effected to slowly increase the pressure. In pulse pressure increase mode, control can be effected to slowly reduce the pressure.

The aforementioned solenoid valves PC1 to PC8 are connected to the anti-skid controlling unit ECU2 so that their solenoid coils are controlled to be energized or deenergized. The electric motor M, too, is connected to the anti-skid controlling unit ECU2 so that it is controlled to be driven. The fluid pressure in the wheel cylinders may be controlled by linear valves (not shown) instead of the solenoid valves PC1 to PC8. In order to generate braking force, a motor or the like may be used to provide a mechanical braking force (not shown) without using brake fluid pressure.

Figure 5:
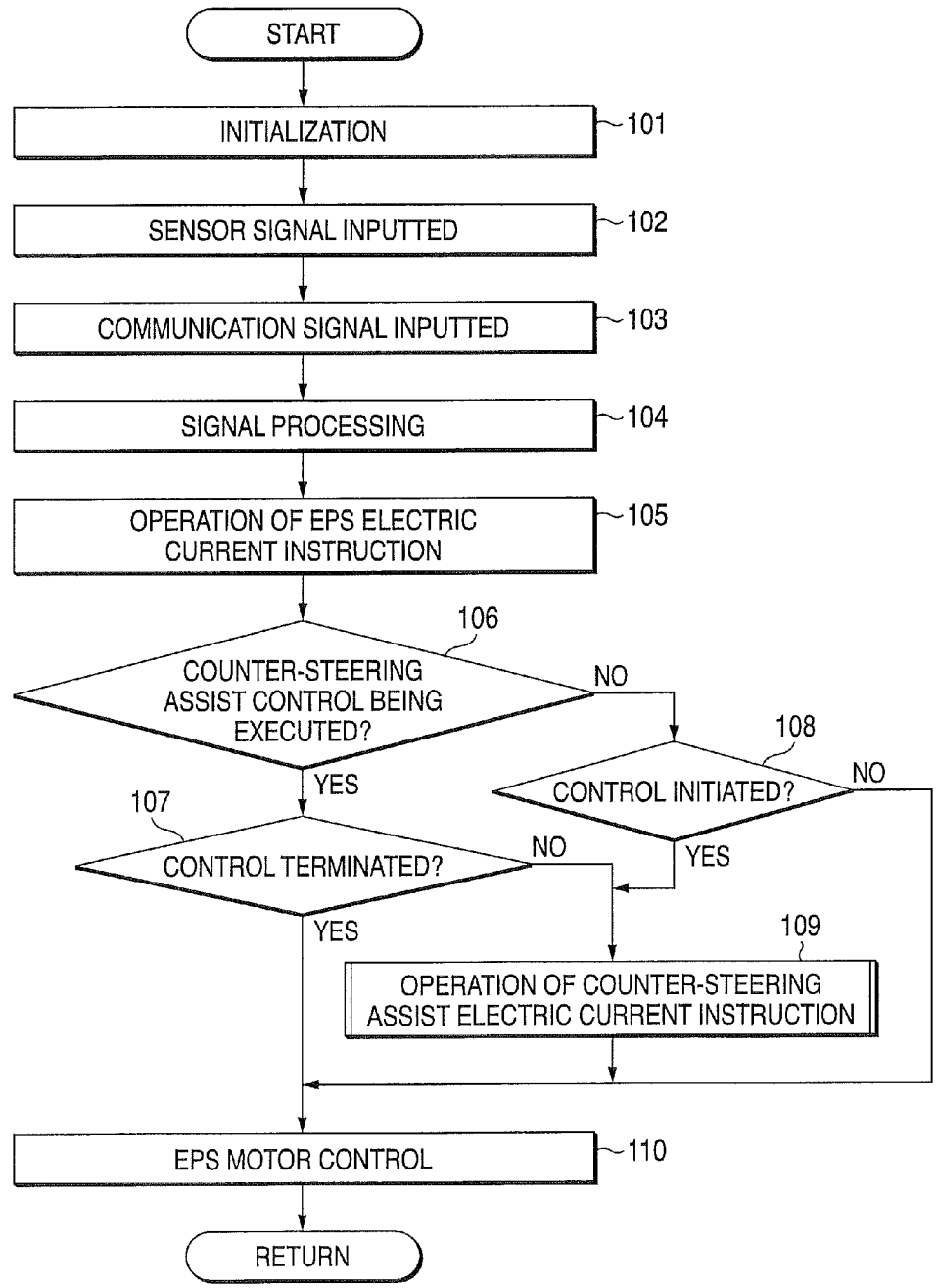
FIG. 5 is a flow chart illustrating the processing of counter-steering assist control in the embodiment of implementation of the invention.

FIG. 5 is a flow chart illustrating the processing of counter-steering assist control in the aforementioned configuration of motor-driven steering controller. Firstly, initialization is executed at step 101. At step 102, sensor signal is inputted. At step 103, necessary signal from the communication bus is read. At step 104, filtering and various signal processings necessary for control are executed. At step 105, the EPS electric current instruction value necessary for ordinary motor-driven steering control is determined on the basis of these signals.

Subsequently, at step 106, it is judged to see if counter-steering assist control has been already executed. If counter-steering assist control has been already executed, the process proceeds to step 107 where control termination is then judged. If counter-steering assist control is not executed, the process proceeds to step 108 where control start is judged. At step 108, it is judged to see if the conditions are satisfied that the vehicle is being braked (stop switch ST is kept ON), the difference in braking force between right wheel and left wheel is not smaller than a predetermined value and the vehicle velocity is not smaller than a predetermined value. If the conditions are satisfied, the process proceeds to step 109 where counter-steering assist control is executed.

At step 107, control termination is judged. That is, if any of the conditions that the vehicle is not being braked (stop switch ST is kept OFF), the difference in braking force between the right wheel and the left wheel falls below a predetermined value and the vehicle velocity falls below a predetermined value is satisfied, counter-steering assist control is terminated. The process then proceeds to step 110. If counter-steering assist control is initiated or continues, the process proceeds to step 109 where counter-steering assist electric current instruction is calculated. At step 110, this instruction is added to EPS instruction to control EPS motor 3.

Figure 6:
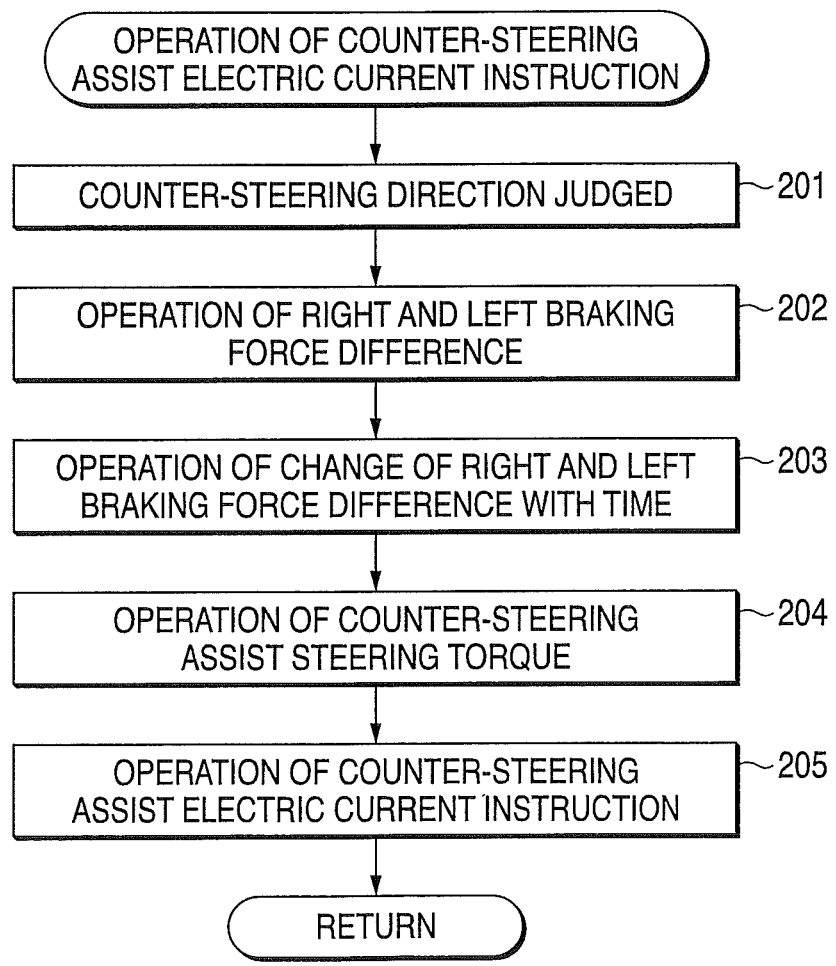
FIG. 6 is a flow chart illustrating the operation of counter-steering assist electric current instruction in the embodiment of implementation of the invention.

FIG. 6 illustrates the operation of counter-steering assist electric instruction executed at step 109. Firstly, at step 201, the direction in which counter-steering is to be effected is judged on the basis of braking force on the various wheels detected by the anti-skid controlling system. If the braking force on the right wheel is larger than the braking force on the left wheel, it is judged that counter-steering in the right turning direction is necessary. In contrast, if the braking force on the left wheel is larger than the braking force on the right wheel, it is judged that counter-steering in the left turning direction is necessary. Subsequently, at step 202, the difference in braking force between right wheel and left wheel is calculated. Further, at step 203, the change of the difference in braking force between right wheel and left wheel with time is calculated. At step 204, the steering torque necessary for counter-steering assist is calculated on the basis of these results of calculation. At step 205, the value for counter-steering assist electric current instruction is calculated on the basis of the results of calculation.

Figure 7:
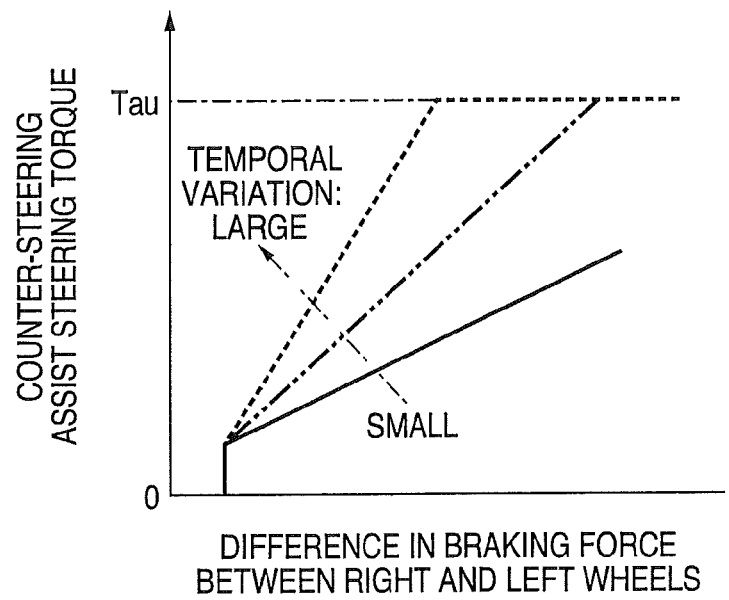
FIG. 7 is a graph illustrating the characteristics of counter-steering assist steering torque in the embodiment of implementation of the invention according to the difference in braking force between the right and left wheels.
Figure 8:
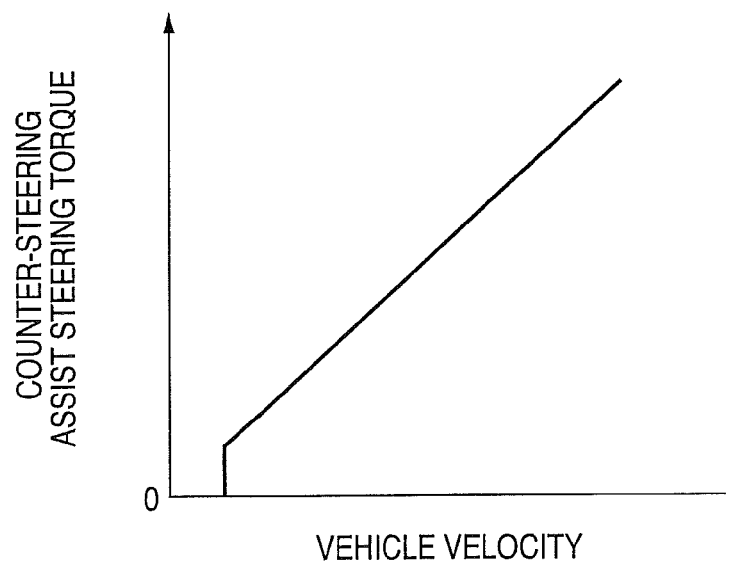
FIG. 8 is a graph illustrating the characteristics of counter-steering assist steering torque in the embodiment of implementation of the invention according to the vehicle velocity.

The counter-steering assist steering torque (hereinafter simply referred to as "assist steering torque") calculated at step 204 is set to be larger as the difference in braking force between right and left wheels increases and the rate of temporal variation of the difference in braking force between right and left wheels increases as shown in FIG. 7. Since the assist steering torque is set to have an upper limit of Tau as shown in FIG. 7, the operator can override steering operation even if erroneous calculation is executed. When the vehicle velocity is large, the variation of yaw moment due to the difference in braking force between right and left wheels is large, making it difficult for the operator to cope with these difficulties. It is therefore preferably arranged such that assist steering torque increases with the rise of vehicle velocity as shown in FIG. 8.

The process thus proceeds to step 205 where corresponding electric current instruction value is determined according to the steering torque necessary for counter-steering assist. This counter-steering electric current instruction value is then added to EPS electric current instruction value to control the EPS motor 3. Since steering torque is added in the direction of counter-steering, the steering wheel is operated in the counter-steering direction according to the difference in braking force between right and left wheels. Accordingly, an operator who cannot execute proper counter-steering can easily execute counter-steering.

As mentioned above, the counter-steering assist control by the provision of steering torque makes it possible to secure the directional stability of the vehicle during braking on μ split road. Thus, anti-skid control can be properly executed, making it possible to improve braking performance of the vehicle. An ordinary anti-skid control is executed such that yaw moment is inhibited on the front wheels and select low control is executed on the rear wheels for the purpose of securing the vehicle stability during anti-skid control on μ split road. Both the controls are adapted to inhibit the braking force on high μ side where braking force can be afforded and reduce yaw moment that induces vehicle instability. The counter-steering assist control can be executed to secure vehicle stability by steering. By properly setting anti-skid control parameters, both vehicle stability and braking performance can be secured.

Figure 9:
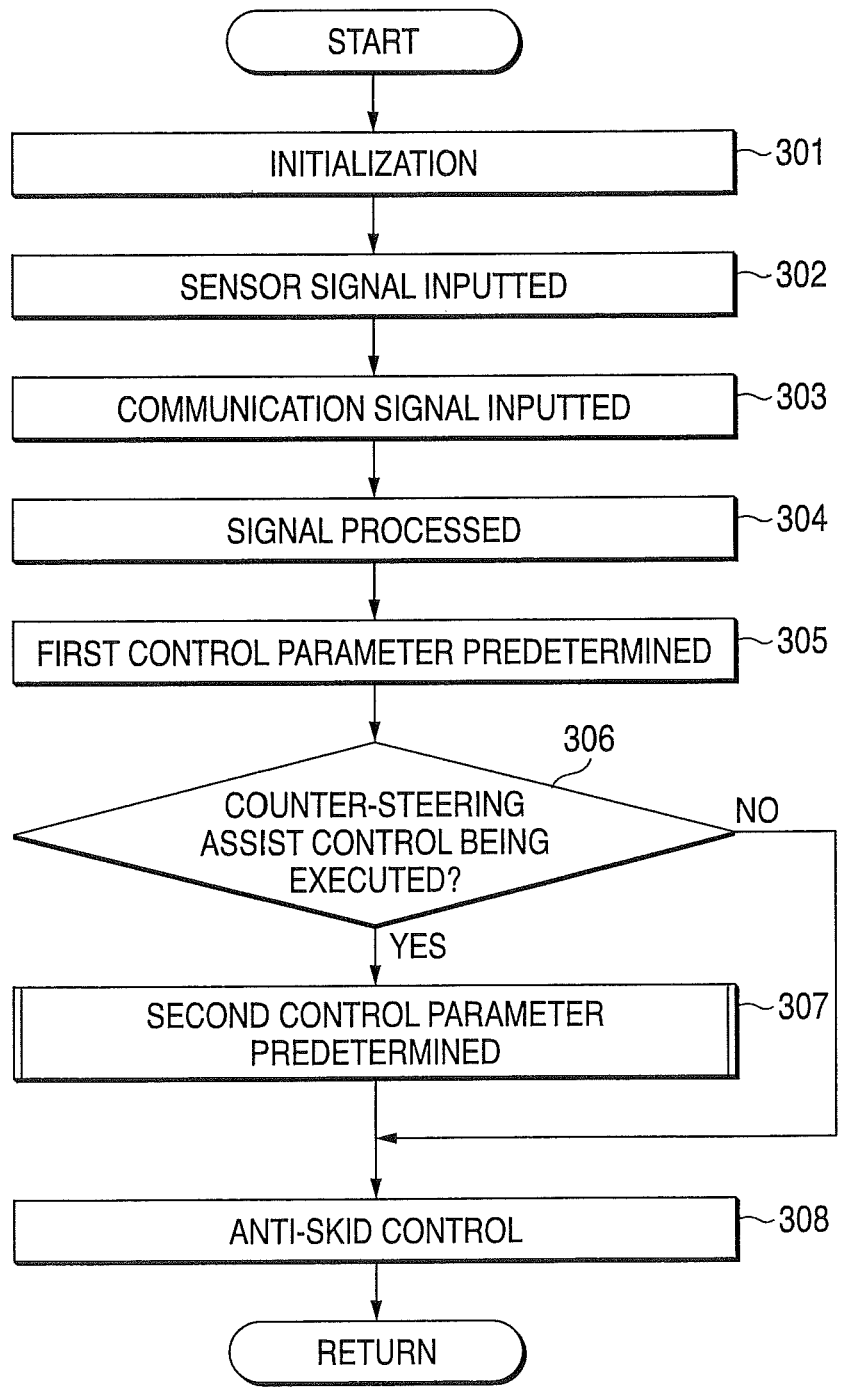
FIG. 9 is a flow chart illustrating the processing of anti-skid control in the case of execution of counter-steering assist control in the embodiment of implementation of the invention.

FIG. 9 illustrates the processing of anti-skid control during the execution of counter-steering assist control. Firstly, at step 301, initialization is executed. At step 302, a sensor signal is inputted. At step 303, a communication signal from the communication bus is read. The communication signal is a steering angle signal to be provided for control flag of counter-steering assist control and motor-driven steering control. Subsequently, at step 304, filtering and various signal processings necessary for control are executed. At step 305, control parameter necessary for ordinary anti-skid control (i.e., first control parameter) is set.

Subsequently, at step 306, it is judged to see if counter-steering assist control is being executed. If it is judged that counter-steering assist control is being executed, the process proceeds to step 307 where a specific parameter (i.e., second control parameter) is then set. The process then proceeds to step 308. If it is judged that counter-steering assist control is not being executed, the process proceeds to step 308 with the first control parameter set at step 305. At step 308, anti-skid control is then executed. If counter-steering assist control is executed, the directional stability of the vehicle is secured by steering. Accordingly, the second control parameter is predetermined to make the effective use of braking force on the side having a high road frictional coefficient to reduce the braking distance. The specific control parameter on the front and rear wheels (second control parameter) will be described hereinafter.

Figure 10:
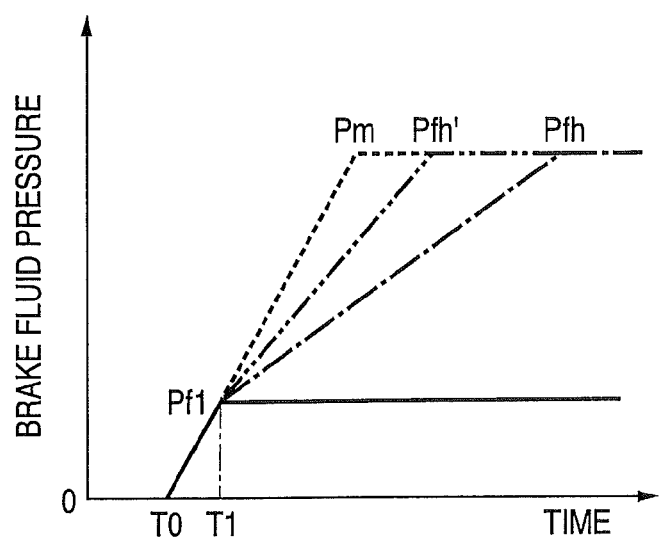
FIG. 10 is a graph illustrating the characteristics of brake fluid pressure in specific anti-skid control over the front wheels during counter-steering assist control in the embodiment of implementation of the invention.

FIG. 10 illustrates specific anti-skid control over the front wheels during counter-steering assist control. When the operator works a brake pedal BP at time T0, the master cylinder fluid pressure rises from 0 to Pm as shown by the broken line. When the front wheel on low μ side reaches its frictional limit, e.g., at time T1, anti-skid control is then executed. At this point, the front wheel on high μ side is subjected to yaw moment inhibition control so that the master cylinder fluid pressure rises slowly from Pfl to Pfh as shown by the one-dotted chain line in FIG. 10 with such a time gradient that no unnecessary yaw moment is generated. In contrast, if counter-steering inhibition control is executed, control is executed such that the fluid pressure rises from Pfl to Pfh as shown by the two-dotted chain line in FIG. 10 with a largely-set time gradient because yaw moment inhibition is executed by steering. Further, yaw moment inhibition control may be inhibited. In this case, the brake fluid pressure on high μ side wheel rises similarly to the master cylinder fluid pressure.

Figure 11:
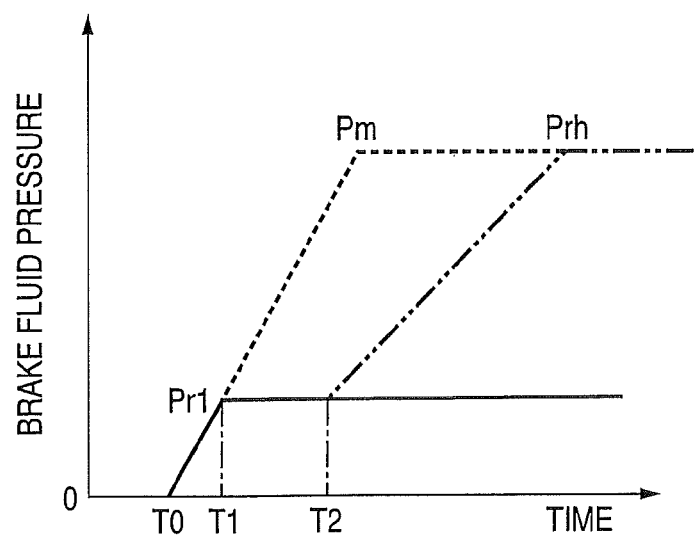
FIG. 11 is a graph illustrating the characteristics of brake fluid pressure in specific anti-skid control over the rear wheels during counter-steering assist control in the embodiment of implementation of the invention.

FIG. 11 illustrates specific anti-skid control over the rear wheels during counter-steering assist control. In general, in select low control, if anti-skid control begins on low μ side wheel at time T1, high μ side wheel is subjected to the same anti-skid control as low μ side wheel is. Thus, the brake fluid pressure on high μ side wheel is limited in the same manner as low μ side wheel is. In contrast, if counter-steering assist control is executed, select low control is executed for only a predetermined period of time (between T1 and T2 in FIG. 11) to inhibit sudden yaw change in the initial stage of braking. Thereafter, control is executed such that the fluid pressure gradually rises with a time gradient as shown by the two-dotted chain line. If the vehicle velocity is large, the period for executing the select low control is set to be long, and/or the time gradient of rise of brake fluid pressure on high μ side is set to be low, in order to further secure the vehicle stability.

Figure 12:
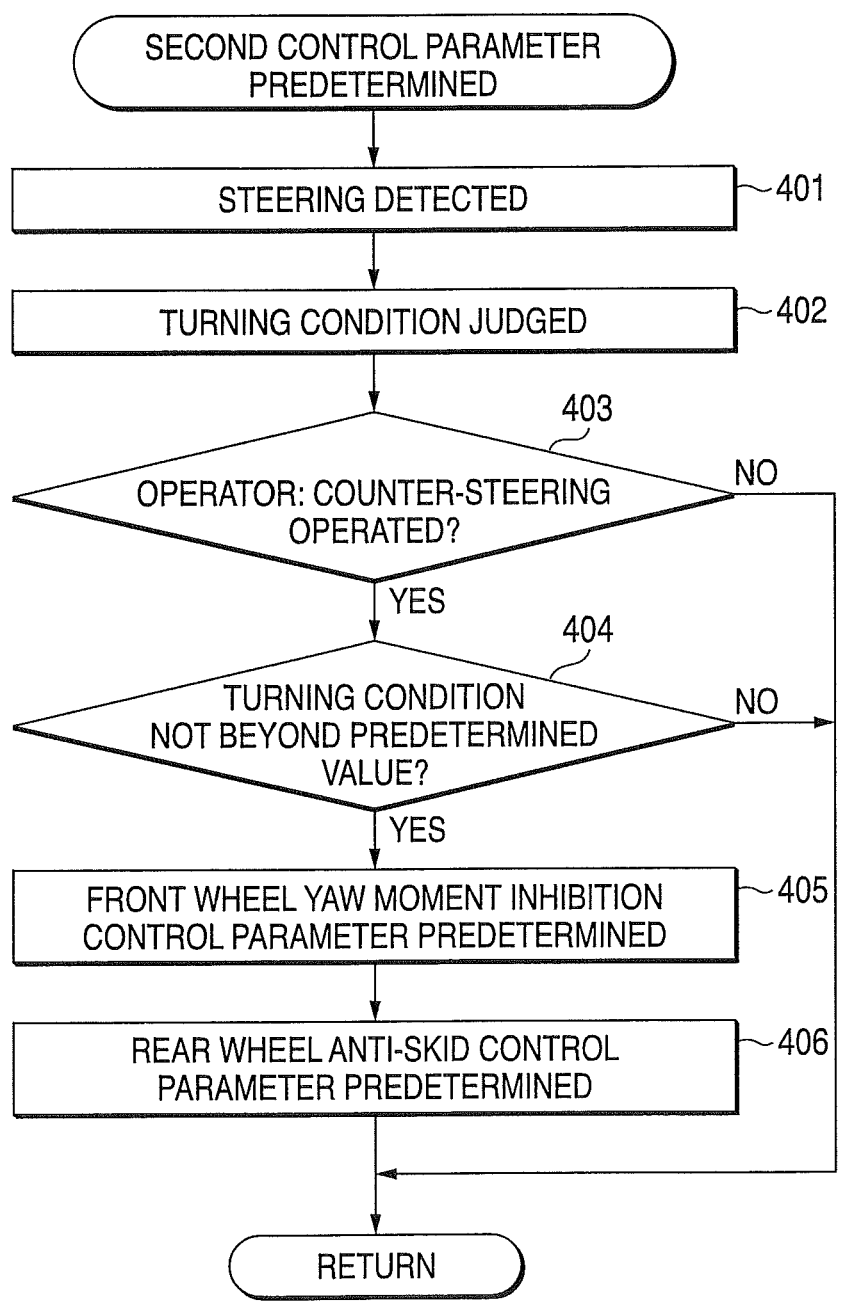
FIG. 12 is a flow chart illustrating the processing of counter-steering assist control in the embodiment of implementation of the invention.

It is further necessary to take into account the situation in which, if counter-steering assist control is executed, the operator hold the steering wheel 1. FIG. 12 illustrates the processing to be executed if at step 307 in FIG. 9, specific anti-skid control is executed during counter-steering assist control as shown in FIGS. 10 and 11, i.e., on the basis of the second control parameter. Firstly, at step 401, the operator's steering operation during counter-steering assist control is detected on the basis of steering angle signal. At step 402, the turning condition of the vehicle is judged. The process then proceeds to steps 403 and 404. If the operator does not execute counter-steering operation even during counter-steering assist control, or if the turning condition of the vehicle is beyond a predetermined value, the process then returns to the routine in FIG. 9 where ordinary anti-skid control (first control parameter) is then executed. In contrast, if the operator executes counter-steering operation at steps 403 and 404 and if the turning condition of the vehicle is judged to be not beyond a predetermined value, the process proceeds to steps 405 and 406 where the same specific control parameter (second control parameter) as mentioned above is then set.

Since the turning of the vehicle is accompanied by the shift of load between the right and left wheels, there occurs a difference in braking force between the right and left wheels during anti-skid control even if there is no difference in road frictional coefficient between the right and left wheels. Therefore, the present embodiment is arranged such that if load shift due to turning makes difference in braking force between the right and left wheels, counter-steering assist control is not executed. Which the difference in braking force is attributed to load shift or difference in road frictional coefficient can be judged by the turning condition and the brake fluid pressure. The turning condition of the vehicle can be calculated from the steering angle and vehicle velocity. If there are provided a yaw rate sensor and a transverse acceleration sensor, these sensor signals may be utilized. Therefore, load shift can be determined from the turning condition. It can be judged from the fluid pressure sensor signal to see which anti-skid control has been executed due to load shift or reduction of road frictional coefficient. In other words, it is judged to see which the difference in braking force between the right and left wheels during turning has occurred due to load shift alone or difference in road frictional coefficient between the right and left wheels.

The difference in braking force between the right and left wheels due to load shift occurs when the turning condition of the vehicle increases (when the transverse acceleration increases). However, when the difference in braking force between the right and left wheels occurs due to difference in road frictional coefficient between the right and left wheels, the turning condition of the vehicle doesn't increase (the vehicle cannot take a turn with excessive transverse acceleration) because one of the wheels is on low μ side. Accordingly, a simple arrangement may be made such that if the turning of the vehicle occurs with a transverse acceleration of not lower than a predetermined value, it is judged that some difference in braking force between the right and left wheels due to load shift has occurred and counter-steering assist control is not executed.

In the case where the vehicle is taking a turn and there occurs a difference in road μ between the right and left wheels (turning μ split), if the outer wheel on the turning curve is positioned on low μ road, braking causes the drop of side force and causes the vehicle to shift outwardly from the turning curve. Further, the difference in braking force between the right and left wheels makes it easy for both the rear wheels to ride on low μ road side, occasionally rendering the vehicle extremely unstable. When the inner wheel on the turning curve is positioned on low μ road, both side force drop and difference in braking force between the right and left wheels act to cause the vehicle to shift outwardly from the turning curve. Therefore, in the case of turning μ split, it is preferable that the amount of counter-steering assist control be predetermined to be larger than during forward running. In this case, the controlled amount of steering torque to be provided is preferably predetermined according to the turning condition.

While the present embodiment has been described with reference to the case where the difference in braking force between the right and left wheels is detected by the fluid pressure sensor PW provided on the wheel cylinder of the wheels, the invention is not limited thereto. For example, the brake fluid pressure on the various wheels may be determined from the detection signals from the fluid pressure sensors PS1 and PS2 of the master cylinder MC and the driven state of the solenoid valves PC1 to PC8 to estimate the difference in braking force between the right and left wheels.

A vehicle provided with a vehicle stability controlling unit such as vehicle having a motion controller disclosed in JP-A-9-301148 intentionally controls the difference in braking force between the right and left wheels to generate yaw moment for stabilizing the vehicle during vehicle stability control. However, since counter-steering assist control acts to inhibit yaw moment caused by the difference in braking force between the right and left wheels, the two controls have opposing effects. Accordingly, if vehicle stability control is executed, it is preferred that counter-steering control be not executed. The present embodiment is arranged such that if vehicle stability control by a vehicle stability controlling unit is executed, the provision of assist steering torque is inhibited.

Being arranged as mentioned above, the invention has the following advantages. In some detail, steering torque is added in the counter-steering direction by an assist steering torque providing unit, making it assured that the steering wheel can be operated in the counter-steering direction according to the difference in braking force between the right and left wheels. Accordingly, even an operator who cannot operate proper counter-steering can easily executed counter-steering.

In the case where a vehicle stability controlling unit is provided, counter-steering assist control is not executed, making it possible to control vehicle stability properly.

The aforementioned assist steering torque providing unit executes proper counter-steering according to the operational condition of the vehicle.

Referring to the anti-skid controller of the vehicle provided with a motor-driven steering controller, counter-steering can be easily executed during anti-skid control and the braking force on high frictional coefficient side can be made the best use of, making it possible to reduce the braking distance.

Further, by using the control parameter setting unit, anti-skid control can be properly executed according to the operational state of the vehicle.

Further, by using the system having the steering direction judging unit and the aforementioned control parameter setting unit, anti-skid control can be properly executed according to the turning condition of the vehicle.

What is claimed is:

1. An electric power steering assist controlling apparatus for a vehicle, comprising:
   a steering torque controlling unit controlling an electric power assisted steering motor to control a steering torque on a steering wheel depending on an operator's steering operation to reduce an operator's power required to operate the steering wheel;
   a braking force estimating unit for estimating braking forces to be imposed on wheels of the vehicle;
   a right and left braking force difference estimating unit for estimating a difference between the braking forces to be imposed on the right and left wheels each estimated by the braking forces estimating unit;
   wherein when the braking forces are applied to the right and left wheels of the vehicle on a road where the frictional coefficient differs from right to left, the difference in braking force between right and left wheels is generated, thereby generating a yaw moment that causes the vehicle to be deflected toward a higher road frictional coefficient side; and
   an assist steering torque providing unit for providing a counter-steering assist steering torque which assists an operator's counter steering operation on the steering wheel for the steering torque controlling unit on the basis of the difference in braking force between right and left wheels estimated by the right and left braking force difference estimating unit,
   wherein the assist steering torque providing unit adds the counter-steering assist steering torque to the steering torque controlled by the steering torque controlling unit so that the steering wheel is operated in a direction to reduce the yaw moment of the vehicle generated due to the difference in braking force between right and left wheels.

2. The electric power steering assist controlling apparatus as claimed in claim 1, wherein the assist steering torque providing unit is arranged so as to set the assist steering torque depending on a temporal variation in the difference between the braking forces of the right and left wheels estimated by the right and left braking force difference estimating unit.

3. The electric power steering assist controlling apparatus as claimed in claim 1, wherein the assist steering torque providing unit is arranged so as to set the assist steering torque larger as a velocity of the vehicle increases.

4. The electric power steering assist controlling apparatus as claimed in claim 1, wherein the assist steering torque providing unit is arranged so as to set the assist steering torque larger when the vehicle takes a turn than when the vehicle goes straight ahead.

5. An anti-skid controller in a vehicle including the electric power steering assist controlling apparatus as claimed in claim 1, comprising:
   a control parameter setting unit for setting a first control parameter for restraining the braking force on the higher road frictional coefficient side where braking force can be afforded to reduce the yaw moment that induces vehicle stability when provision of the counter-steering assist steering torque by the assist steering torque providing unit is not effected, and for setting a second control parameter different from the first control parameter for utilizing the braking force on the higher road frictional coefficient side to reduce the braking distance when provision of the counter-steering assist steering torque by the assist steering torque providing unit is effected; and
   a braking force controlling unit for controlling the braking forces to be imposed on the wheels depending on the first control parameter set by the control parameter setting unit and the second control parameter set by the control parameter setting unit.

6. The anti-skid controller as claimed in claim 5, wherein the control parameter setting unit is arranged so as to set the first control parameter to be a parameter for reduction control of yaw moment that causes a braking force for one of front wheels of the vehicle to rise slowly with a time gradient when anti-skid control begins on the other front wheel; and
   the control parameter setting unit is arranged so as to set the second control parameter to be a parameter having a larger time gradient than the first control parameter or a parameter for inhibiting the reduction control of yaw moment.

7. The anti-skid controller as claimed in claim 5, wherein the control parameter setting unit is arranged so as to set the first control parameter to be a select low control parameter for controlling a braking force on one of rear wheels of the vehicle in the same manner as on the other rear wheel when anti-skid begins on the other rear wheel; and
   the control parameter setting unit is arranged so as to set the second control parameter to be a parameter for causing the braking force on the one of the rear wheels to rise with a time gradient after a predetermined period of time of select low control.

8. The anti-skid controller as claimed in claim 6, wherein the control parameter setting unit is arranged so as to set the second control parameter when the turning condition of the vehicle is not beyond a predetermined value.

9. The anti-skid controller as claimed in claim 7, wherein the control parameter setting unit is arranged so as to set the second control parameter when the turning condition of the vehicle is not beyond a predetermined value.

10. The anti-skid controller as claimed in claim 5, further comprising a steering direction judging unit for judging a direction of steering by the steering operation; wherein
    the control parameter setting unit is arranged so as to inhibit the setting of the second control parameter when the steering direction judging unit judges that steering is not made in the direction for a counter-steering operation regardless of the fact that a provision of assist steering torque by the assist steering torque providing unit is effected.

11. An electric power steering assist controlling apparatus according to claim 1, further comprising an electric power steering motor connected to the wheels, wherein the steering torque controlling unit determines an electric power steering instruction value necessary to control the electric power steering motor to reduce the operator's power required to operate the steering wheel and the assist steering torque providing unit adds a counter-steering assist instruction value corresponding to the counter-steering assist steering torque to the electric power steering instruction value to control the electric power steering motor so as to reduce the yaw moment of the vehicle.

12. An electric power steering assist controlling apparatus according to claim 1, wherein the assist steering torque providing unit sets an upper limit of the counter-steering assist steering torque so that the operator can override steering operation.

13. An electric power steering assist controlling apparatus according to claim 1, wherein the assist steering torque providing unit prohibits providing the counter-steering assist steering torque if the difference in braking force between right and left wheels is generated by load shift between right and left wheels due to a turning of the vehicle.

14. An electric power steering assist controlling apparatus according to claim 1, wherein the assist steering torque providing unit terminates providing the counter-steering assist steering torque when at least one of the following conditions is satisfied: the vehicle is not being braked, the difference in braking force between right and left wheels falls below a predetermined value, and a vehicle velocity falls below a predetermined value.

15. An electric power steering assist controlling apparatus according to claim 1, further comprising a steering torque sensor detecting the steering torque on the steering wheel, the steering torque controlling unit determining an electric power steering instruction steering torque based on the steering torque detected by the steering torque sensor, and the assist steering torque providing unit adding the counter-steering assist steering torque to the electric power steering instruction steering torque to control the electric power assisted steering motor so that the steering wheel is operated in the direction to assist the operator's counter steering operation on the steering wheel.

16. The electric power steering assist controlling apparatus as claimed in claim 1, wherein the assist steering torque providing unit provides a counter-steering assist steering torque which assists an operator's counter-steering operation on the steering wheel for the steering torque controlling unit in the counter-steering direction when an anti-skid control is executed during braking on the road where the friction coefficient differs from right to left thereby generating the difference in braking force between right and left wheels.

17. The electric power steering assist controlling apparatus as claimed in claim 1, further comprising a vehicle stability controlling unit for controlling a stability of the vehicle depending on a traveling state of the vehicle, wherein the assist steering torque providing unit is arranged so as to inhibit providing the assist steering torque when the stability of the vehicle is controlled by the vehicle stability controlling unit.

18. An electric power steering assist controlling apparatus for a vehicle, comprising:
  an electric power steering motor connected to a vehicle wheel;
  an electric power steering instruction value determination unit for determining an electric power steering instruction value necessary to control the electric power steering motor to reduce an operator's power required to operate a steering wheel;
  a braking force estimating unit for estimating braking forces to be imposed on wheels of the vehicle;
  a right and left braking force difference estimating unit for estimating difference between the braking forces to be imposed on the right and left wheels each estimated by the braking forces estimating unit;
  wherein when an anti-skid control is executed during braking on a road where the frictional coefficient differs from right to left, the difference in braking force between right and left wheels is generated by the anti-skid control thereby generating a yaw moment that causes the vehicle to be directed toward a higher road frictional coefficient side; and
  an assist steering torque providing unit for determining a counter-steering assist steering torque to assist an operator's counter-steering operation on the steering wheel on the basis of the difference in braking force between right and left wheels estimated by the right and left brake force difference estimating unit, and for adding a counter-steering assist instruction value corresponding to the counter-steering assist torque to the electric power steering instruction value to control the electric power steering motor so that the steering wheel is operated in a direction to reduce the yaw moment of the vehicle generated due to the difference in braking force between right and left wheels.

19. An electric power steering assist controlling apparatus according to claim 18, further comprising a steering torque sensor detecting a steering torque on the steering wheel, the electric power steering instruction value determination unit determining an electric power steering instruction steering torque as the electric power steering instruction value based on the steering torque detected by the steering torque sensor, and the assist steering torque providing unit adding the counter-steering assist steering torque to the electric power steering instruction steering torque to control the electric power steering motor so that the steering wheel is operated in the direction to assist the operator's counter steering operation on the steering wheel.

20. An electric power steering assist controlling apparatus for a vehicle comprising:
  a steering torque controlling unit controlling an electric power assisted steering motor to control a steering torque on a steering wheel depending on an operator's steering operation to reduce an operator's power required to operate the steering wheel; and
  an assist steering torque providing unit for providing a counter-steering assist steering torque which assists an operator's counter-steering operation on the steering wheel for the steering torque controlling unit when a difference in braking force between right and left wheels is generated during braking of the vehicle,
  wherein the assist steering torque providing unit adds the counter-steering assist steering torque to the steering torque controlled by the steering torque controlling unit so that the steering wheel is operated in a direction to reduce a yaw moment of the vehicle generated due to the difference in braking force between right and left wheels.

21. The electric power steering assist controlling apparatus as claimed in claim 20, wherein the assist steering torque providing unit is arranged so as to set the assist steering torque depending on a temporal variation in the difference between the braking forces of the right and left wheels generated during braking of the vehicle.

22. The electric power steering assist controlling apparatus as claimed in claim 20, wherein the assist steering torque providing unit is arranged so as to set the assist steering torque larger as a velocity of the vehicle increases.

23. The electric power steering assist controlling apparatus as claimed in claim 20, wherein the assist steering torque providing unit is arranged so as to set the assist steering torque larger when the vehicle is turning than when the vehicle is moving straight ahead.

24. An electric power steering assist controlling apparatus according to claim 20, further comprising an electric power steering motor connected to the wheels, wherein the steering torque controlling unit determines an electric power steering instruction value necessary to control the electric power steering motor to reduce the operator's power required to operate the steering wheel and the assist steering torque providing unit adds a counter-steering assist instruction value corresponding to the counter-steering assist steering torque to the electric power steering instruction value to control the electric power steering motor so as to reduce the yaw moment of the vehicle.

25. An electric power steering assist controlling apparatus according to claim 20, wherein the assist steering torque providing unit terminates providing the counter-steering assist steering torque when at least one of the following conditions is satisfied: the vehicle is not being braked, the difference in braking force between right and left wheels falls below a predetermined value, and a vehicle velocity falls below a predetermined value.

26. An electric power steering assist controlling apparatus according to claim 20, further comprising a steering torque sensor detecting the steering torque on the steering wheel, the steering torque controlling unit determining an electric power steering instruction steering torque based on the steering torque detected by the steering torque sensor, and the assist steering torque providing unit adding the counter-steering assist steering torque to the electric power steering instruction steering torque to control the electric power assisted steering motor so that the steering wheel is operated in the direction to assist the operator's counter steering operation on the steering wheel.

27. The electric power steering assist controlling apparatus as claimed in claim 20, further comprising a vehicle stability controlling unit for controlling a stability of the vehicle depending on a traveling state of the vehicle, wherein the assist steering torque providing unit is arranged so as to inhibit providing the assist steering torque when the stability of the vehicle is controlled by the vehicle stability controlling unit.

28. The electric power steering assist controlling apparatus according to claim 20, wherein the assist steering torque providing unit prohibits providing the counter-steering assist steering torque when a turning condition of the vehicle is higher than a predetermined value.

29. The electric power steering assist controlling apparatus according to claim 20, wherein the assist steering torque providing unit starts providing the counter-steering assist steering torque when the difference in braking force between right and left wheels is greater than a predetermined value and when a vehicle velocity is higher than a predetermined value.

* * * * *